United States Patent [19]
Walters

[11] Patent Number: 5,033,257
[45] Date of Patent: Jul. 23, 1991

[54] CONDITIONER ROLL TENSION SYSTEM

[75] Inventor: James C. Walters, Ottumwa, Iowa

[73] Assignee: Deere & Company, Moline, Ill.

[21] Appl. No.: 529,798

[22] Filed: May 29, 1990

[51] Int. Cl.$^5$ .................. A01D 43/10; A01D 82/00
[52] U.S. Cl. .......................................... 56/16.4; 56/1;
  56/DIG. 1; 100/169
[58] Field of Search .................. 56/1, 14.1, 14.4, 16.4,
  56/DIG. 1, DIG. 23; 100/168, 169, 171

[56] References Cited

U.S. PATENT DOCUMENTS

| | | | |
|---|---|---|---|
| 3,474,601 | 10/1969 | Burrough et al. | 56/DIG. 1 |
| 3,733,796 | 5/1973 | Wood et al. | 56/220 |
| 3,881,301 | 5/1975 | Sawyer et al. | 56/14.4 |
| 4,472,927 | 9/1984 | Vogt et al. | 56/16.4 |
| 4,546,599 | 10/1985 | Cicci et al. | 56/DIG. 1 |
| 4,843,804 | 7/1989 | Wellman | 56/16.4 |
| 4,961,303 | 10/1990 | McCarty et al. | 56/DIG. 1 |

*Primary Examiner*—Ramon S. Britts
*Assistant Examiner*—David J. Bagnell

[57] ABSTRACT

A mower conditioner includes a main frame having a header connected thereto by a four bar linkage which permits the header to float over the ground during harvesting operation. The header carries upper and lower conditioner rolls with the opposite ends of the upper roll being respectively mounted to a pair of arms mounted for pivoting vertically such that the upper roll moves towards or away from the lower roll in response to crop density variations. A float spring assembly is provided at each side of the mower conditioner and each has its upper end supported by the frame and has its lower end pivotally coupled to a force transfer linkage that is pivotally mounted to the header for movement about a transverse axis and is pivotally linked to an adjacent one of the conditioner roll support arms whereby the force transfer linkage acts to transfer a lifting force to the header and a downward biasing force to the upper conditioner roll.

5 Claims, 3 Drawing Sheets

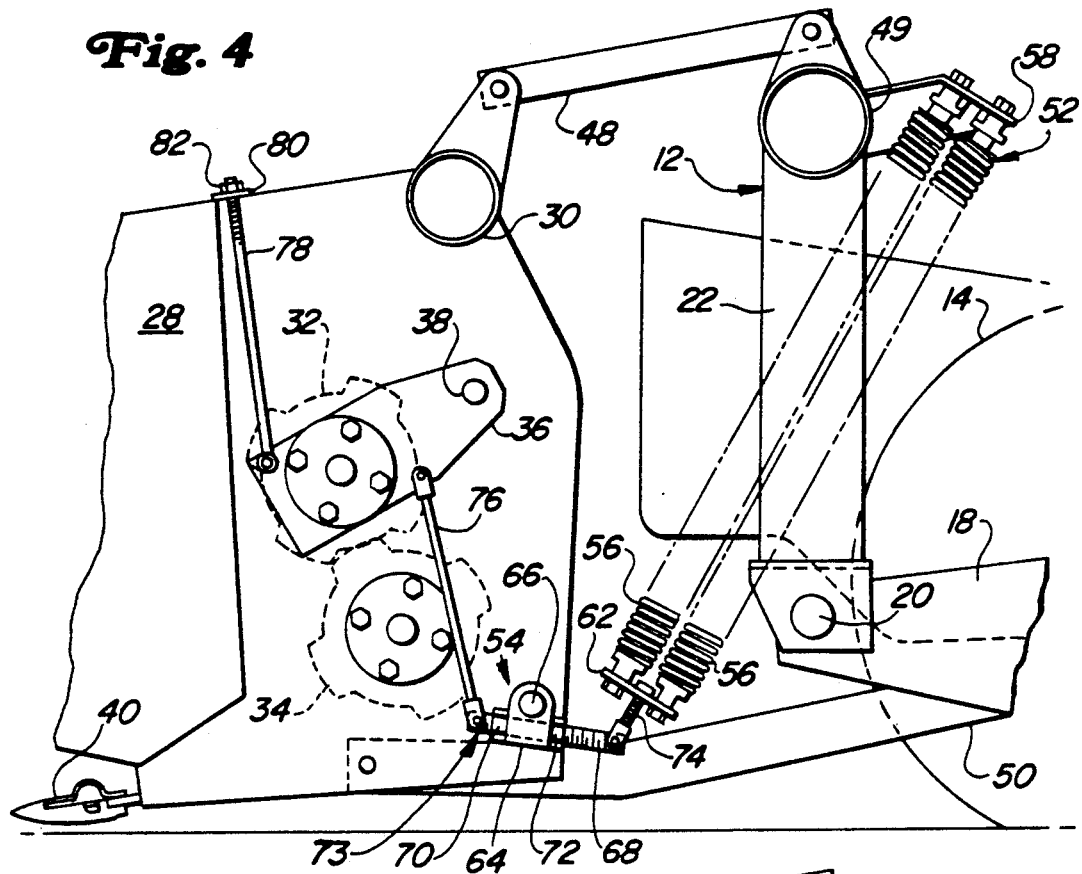
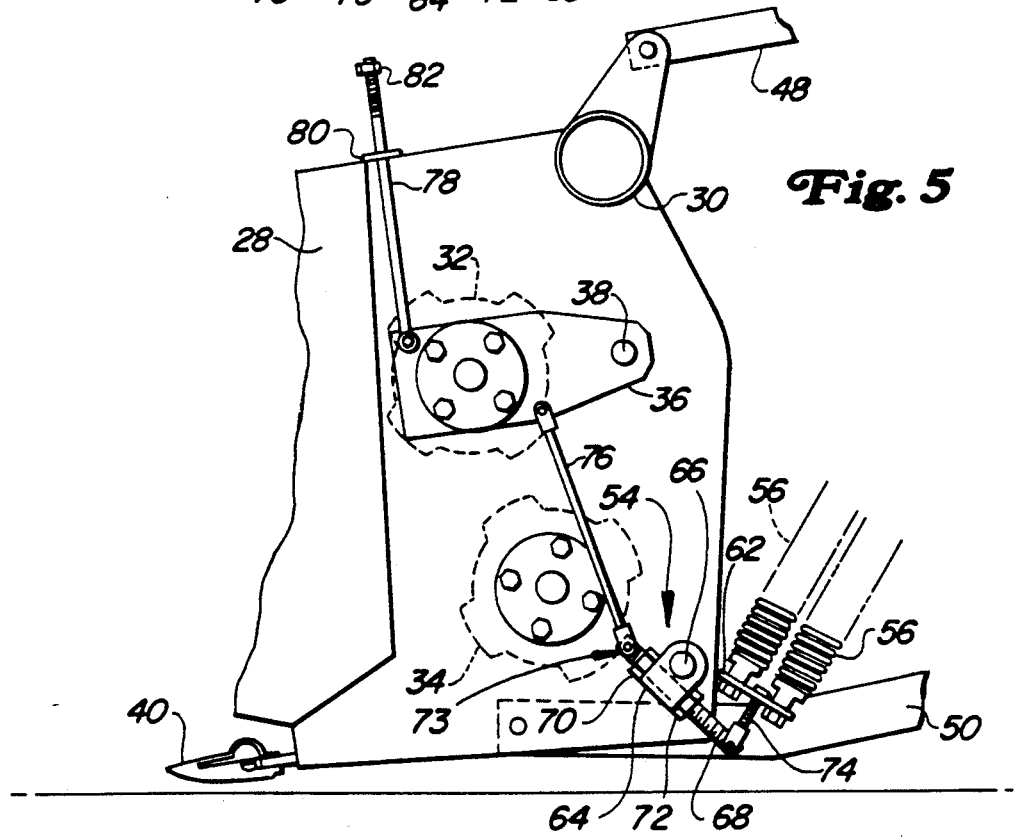

CONDITIONER ROLL TENSION SYSTEM

BACKGROUND OF THE INVENTION

The present invention relates to mower conditioners and more specifically relates to a manner of providing tension for yieldably biasing a vertically swingable upper conditioner roll towards a fixed lower conditioner roll.

The upper roll of a double roll conditioner is normally carried by a pair of pivotally mounted arms whereby it is allowed to float vertically to compensate for uneven crop flow. The upper roll is spring-loaded toward the lower roll to maintain a pressure on the crop as it passes between the rolls. The upper roll pressure can be manually adjusted to accommodate various crop types, e.g., sorghums, rhizomes, legumes, etc. Most mower conditioners have a roll tension system that has its own spring or springs. Recently, some mower conditioners have been constructed such that the header float springs also supply the biasing force to the upper conditioner roll. Examples of such structures are disclosed in U.S. Pat. Nos. 3,733,796; 3,881,301 and 4,843,804. While such double use of the float springs is advantageous, the linkage required to permit such use is often rather complex.

SUMMARY OF THE INVENTION

According to the present invention there is provided a novel mower conditioner and bore specifically there is provided a novel linkage for transmitting force exerted by the header float springs to the upper conditioner roll.

An object of the invention is to provide a simple linkage for transferring force from header float springs to the upper conditioner roll of a mower conditioner.

A more specific object of the invention is to provide a linkage, as set forth in the preceding object, which is easily adjustable for changing the amount of force transferred to the upper conditioner roll to thereby vary the roll pressure to accommodate various crop types.

These and other objects are made possible by a linkage provided at each side of a mower conditioner and including a lever comprising a threaded rod mounted to a pivot housing for fore-and-aft adjustment, the pivot housing being pivoted to the header of the mower conditioner at a location adjacent the lower end of a float spring assembly including a first lower connecting rod pivotally connected to the rear end of the threaded rod. A second connecting rod has its lower end pivotally connected to the front end of the threaded rod and has its upper end pivotally connected to the vertically pivotable arm that supports one end of the upper conditioner roll. Thus, the float spring assembly acts to pull up on the rear of the threaded rod to thereby exert a lifting force on the header, via the pivotal connection of the pivot housing, and to simultaneously exert a downward force on the upper conditioner roll via the second connecting rod and the roll support arm, with the amount of force transmitted to the conditioner roll depending on the fore-and-aft adjusted position of the threaded rod within the pivot housing.

BRIEF DESCRIPTION OF THE DRAWING

FIG. 4 is a view like FIG. 2 but with the threaded rod being shown adjusted for transferring a maximum amount of force to the upper roll.

FIG. 5 is a view like FIG. 4 but with the upper conditioner roll being shown in an open position.

DESCRIPTION OF THE PREFERRED EMBODIMENT

Figure 6:
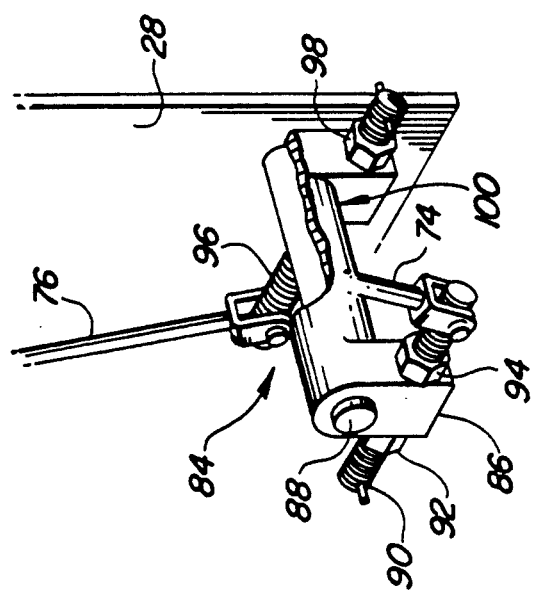
FIG. 6 is a perspective view showing a variation of the lever of the linkage for use with machines where it is not possible to dispose the spring assembly generally within the same vertical plane containing the upper roll support arm.

The description appearing below often refers to parts as being in pairs while only one of the parts is shown in the drawing and it is to be understood that the unshown part is either the same as or is the mirror image of the part that is shown. Further, it is to be noted that, unless otherwise stated, all references to directions such as "front", "rear", "left" and "right" are made from the perspective of a person standing behind and facing the structure being described.

Figure 1:
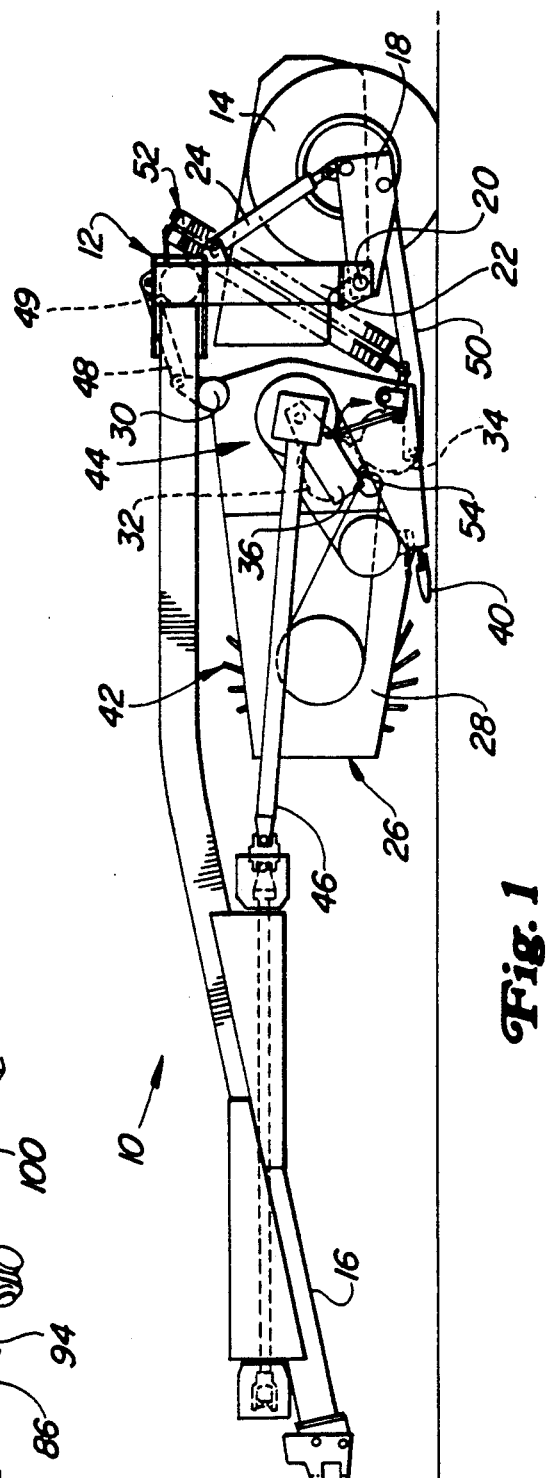
FIG. 1 is a left side elevational view of a mower conditioner embodying a conditioner roll tension system constructed in accordance with the principles of the present invention.

Referring now to FIG. 1, there is shown a mower conditioner 10 here shown as being of a towed type including a main frame 12 supported on a pair of ground wheels 14 and having a draft tongue 16 coupled to an upper left location thereof. The wheels 1 4 are respectively mounted to the rear ends of a pair of trailing wheel support arms 18 which are pivotally mounted, as at 20, to respective depending legs 22 of the frame 12 and coupled between the frame 12 and each of the arms 18 is an extensible and retractable hydraulic cylinder 24 for selectively pivoting the arms so as to adjust the height of the frame relative to the ground for a purpose explained below.

Located forwardly of the frame 12 is a header 26 including spaced upright side walls 28 having upper rear locations thereof joined together by a tubular cross member 30. Mounted between the walls 28 are upper and lower conditioner rolls 32 and 34, respectively. The lower roll 34 has its opposite ends supported directly by the side walls 28 while the upper roll 32 has its opposite ends mounted to respective forward locations of a pair of roll support arms 36 that are respectively vertically pivotally mounted to the side walls 28, as by pins 38, whereby the upper roll may pivot towards and away from the lower roll. A sickle-type cutterbar 40 extends between and is mounted to the side walls 28 at a location forwardly of the conditioner rolls 32 and 34 and a reel 42 is mounted to the walls 28 at a location upwardly and forwardly from the cutterbar so that it can operate to bend uncut crop towards the cutterbar and then sweep the cut crop into the bite of the conditioner rolls. The conditioner rolls 32 and 34, the cutterbar 40 and the reel 42 are all driven by a drive assembly 44 that is mounted to the left side wall 28; and a driveline 46, supported by the tongue 18, has its rear end coupled to an input of the drive assembly and has a forward end adapted for connection to a PTO shaft of a towing tractor.

The header 26 is suspended by a four-bar linkage comprising a centrally located link 48, coupled between a tubular cross member 49, interconnecting the tops of the legs 22 of the frame 12, and the cross member 30 of the header 26, and a parallel pair of lower links 50 each connected between one of the wheel support arms 18 and one of the header side walls 28. Thus, it will be appreciated that the hydraulic cylinders 24 will act through the wheel support arms 18 and lower pair of links 50 to effect raising and lowering of the header together with raising and lowering of the frame 12.

Connected for counter balancing the suspended weight of the header 26 and for also providing a tension for biasing the upper conditioner roll 32 toward the lower roll 34 are a pair of float spring assemblies 52 that are supported by the main frame 12 and respectively coupled to the opposite side walls 28 of the header and to the roll support arms 36 by means of a pair of force transfer linkages 54. Specifically, referring now also to FIGS. 2-5, it can be seen that each spring assembly 52 is located substantially in the same vertical plane as one of the roll support arms 36 and includes a pair of tension springs 56 having their upper ends connected to a bracket 58 which is fixed to the cross member 49. The lower ends of the springs 56 are connected to a plate 62. The force transfer linkages 54 each include a pivot housing 64 pivotally mounted to a respective one of the side walls 28 by means of an outwardly projecting pivot pin 66 fixed to the wall and defining a transverse pivot axis at a location spaced forwardly of and adjacent a lower end of an associated one of the spring assemblies 52. A threaded adjustment rod 68 is received in a fore-and-aft extending bore provided in the pivot housing 64; and front and rear jam nuts 70 and 72, respectively, are threaded onto the rod on opposite sides of the housing and are tightened against the housing so as to clamp or hold the rod in a fixed adjusted position. Thus, it can be seen that the pivot housing 44, adjustment rod 68, and jam nuts 70 and 72 cooperate to form a lever 73. A first link 74 pivotally attaches the rear end of the adjustment rod 68 to the spring assembly plate 62 while an upper link 76 pivotally connects the forward end of the rod to the roll support arm 36. Coupled to each roll support arm 36 is a roll down stop comprising an upright stop rod 78 slidably received in a rod guide 80 and having its lower end pivotally coupled to the arm and having a threaded upper end portion provided with a nut 82 which engages the rod guide so as to limit downward movement of the upper roll 32 relative to the lower roll 34.

Figure 2:
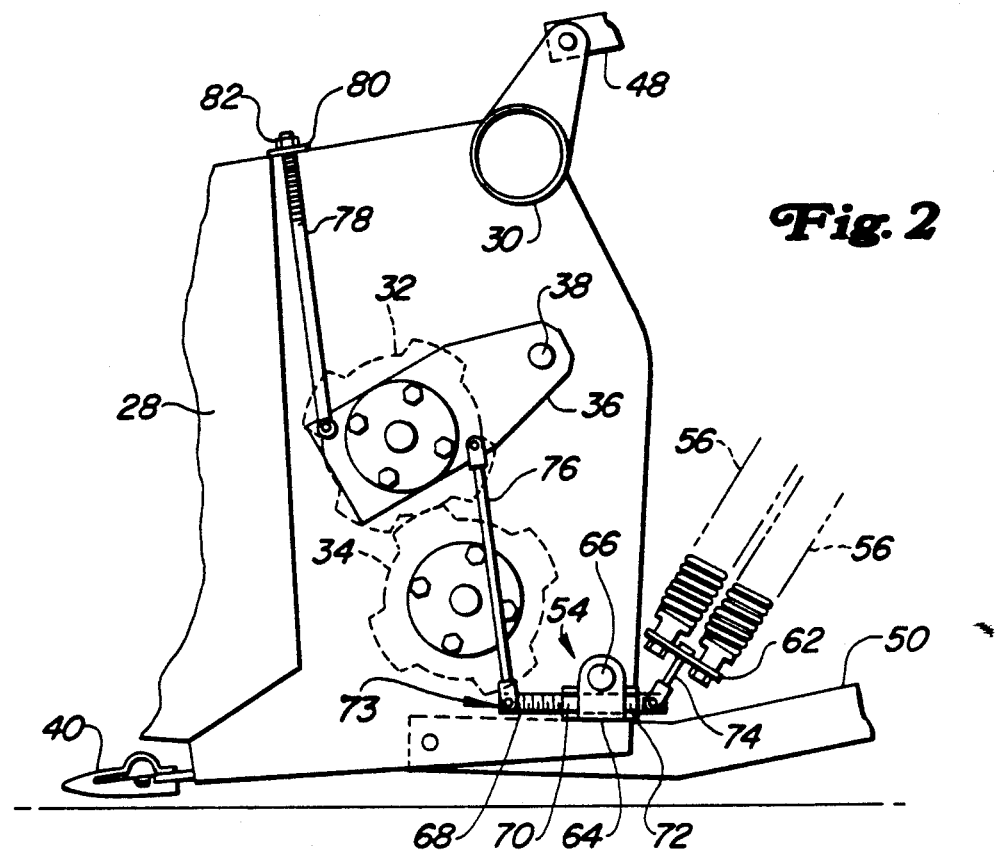
FIG. 2 is an enlarged left side elevational view of the roll tensioning system with the threaded rod of the lever of the force transfer linkage being shown adjusted for transferring a minimum amount of force to the upper roll and with the upper roll being shown in a closed position.
Figure 3:
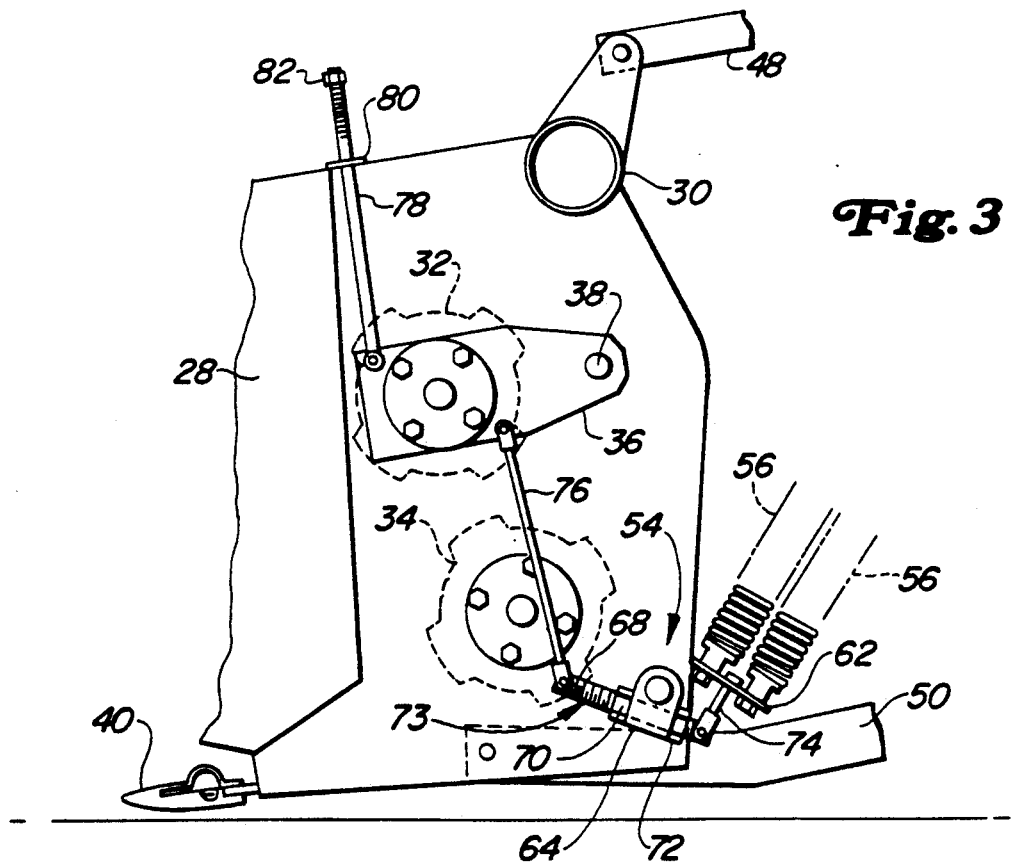
FIG. 3 is a view like FIG. 2 but with the upper conditioner roll being shown in an open position.

Operation of the roll tension assembly at each side of the mower conditioner is as follows. With the header disposed in a lowered cutting position, as shown, the float spring assembly 52 exerts an upward or lifting force on the rear end of the threaded adjustment rod 68. When the rod is in its forward most adjusted position, as shown in FIGS. 2 and 3, a maximum amount of the spring force is transferred to the header 26 by way of the pivot housing 64 and the pivot pin while a minimum amount of the force is transferred to the roll support arm 36 by way of the link 76. In the event that a large mat of crop arrives at the bite of the conditioner rolls 32 and 34, the mat will act through the upper roll 32 to force the roll support arm 36 upwardly against the bias of the spring assembly 52.

The tension force acting on the upper roll support arm 36 may be increased to accommodate different crops by adjusting the adjustment rod 68 rearwardly in the pivot housing 64 with the maximum amount of force being achieved when the rod 68 occupies its rear most position shown in FIGS. 4 and 5. Such adjustment of the rod is achieved by first loosening the front jam nut 70 a desired amount then screwing the rear jam nut 72 to cause the rod 68 to shift rearwardly until housing 64 is once again clamped tightly between the jam nuts 70 and 72.

Referring now to FIG. 6, there is shown a force transfer linkage 84 which embodies a variation of the lever 73 of the force transfer linkage 54 which may be used at the opposite sides of the mower conditioner in the event that it is not possible to dispose the spring assemblies 52 substantially within the respective vertical planes of the upper roll support arms 36. Specifically, the force transfer linkage 84 differs from the linkage 54 in that it includes a pivot housing 86 which is elongated laterally by a distance which is commensurate with the lateral distance between the vertical plane containing the upper roll support arm 36 and a vertical plane in which the spring assembly 52 is located, the housing 86 being received on a similarly elongated pivot pin 88. A further difference is that the pivot housing 86 has an outer threaded adjustment rod 90 adjustably received in an outer fore-and-aft extending bore by a first pair of front and rear jam nuts 92 and 94, and has an inner threaded adjustment rod 96 adjustably received in an inner fore-and-aft extending bore by a second pair of front and rear jam nuts, with only the rear jam nut 98 being visible. Thus, it can be seen that the housing 86, adjustment rods 90 and 96 and the jam nuts 92, 94 and 98 combine to form a lever 100. The first link 74 connects the spring assembly to a rear end of the outer adjustment rod 90 while the second link 76 connects the roll support arm 36 to a forward end of the adjustment rod 96.

It will be appreciated then that the operation of the roll tension assembly, when equipped with a pair of the force transfer linkages 84 respectively embodying a pair of the levers 100 will be the same as that described above except that adjustment of both of the rods 90 and 96 is required to achieve the same force adjustment accomplished by adjusting only the rod 68 of the lever 73 of the force transfer linkage 54.

I claim:

1. In a mower conditioner including a main support frame, a crop header supported from the main frame for vertical floating action when progressing over a field while harvesting a crop therefrom, upper and lower crop conditioner rolls being carried by the header with the upper conditioner roll having each of its opposite ends supported by an arm which is vertically pivotally mounted whereby the upper conditioner roll is mounted for movement towards and away from the lower conditioner roll and a float spring assembly being located at opposite sides of the mower conditioner and coupled to the header and upper conditioner roll by a force transfer linkage disposed such that the header is biased upwardly while the upper conditioner roll is biased downwardly towards the lower conditioner roll, the improvement comprising: each force transfer linkage including a lever being mounted to each of opposite lateral ends of the header for vertical pivotal movement about a horizontal transverse axis located between opposite ends of the lever; each lever having one end pivotally connected to an end of an adjacent one of the spring assemblies and having another end which is pivotally linked to an adjacent one of the roll support arms, whereby the spring assemblies act by way of the levers of the force transfer linkages to exert a lifting force on the header and to exert a downwardly acting force on the roll support arms; and said each lever including adjustment means between the ends thereof for adjusting the distance between the lever ends and said axis to thereby adjust the amount of force transferred to said adjacent one of the support arms.

2. The mower conditioner defined in claim 1 wherein each lever includes a pivot housing mounted for pivoting about said axis; and said adjustment means of each force transfer linkage including a rod shiftably received in a bore provided in the pivot housing, with said one and another ends of the lever being the opposite ends of said rod, and including a clamping means for securing the rod in an adjusted position within the bore.

3. The mower conditioner defined in claim 2 wherein said rod is threaded and said clamping means including a pair of jam nuts respectively located on the rod at opposite sides of the pivot housing.

4. The mower conditioner defined in claim 1 wherein said spring assemblies are each located in a first vertical plane spaced outwardly rom a second vertical plane containing said roll support arms; said levers each including a pivot housing mounted for rotating about said axis; each pivot housing being elongated laterally through a distance commensurate to the distance between the first and second vertical planes with inner and outer ends of the pivot housing being respectively disposed at the first and second vertical planes; a first rod being received in a first bore provided at the outer end of the pivot housing and having an end pivotally connected to the adjacent spring assembly; a second rod being received in a second bore provided at the inner end of the pivot housing and having an end pivotally connected to the adjacent roll support arm; and first and second clamp means for respectively securing the first and second rods at adjusted positions within the first and second bores to thereby adjust the amount of force transferred to the adjacent roll support arm.

5. The mower conditioner defined in claim 4 wherein the first and second rods are threaded and said first and second clamp means respectively include a pair of jam nuts mounted on each of the rods so as to be on opposite sides of the pivot housing.

* * * * *